F. FLORA.
Animal-Traps.

No. 135,268. Patented Jan. 28, 1873.

Witnesses:
P. C. Dieterich
O. Feuginick

Inventor:
F. Flora
per [signature]
Attorneys.

UNITED STATES PATENT OFFICE.

FRANK FLORA, OF PIERCE, OHIO.

IMPROVEMENT IN ANIMAL-TRAPS.

Specification forming part of Letters Patent No. 135,268, dated January 28, 1873.

*To all whom it may concern:*

Figure 1:
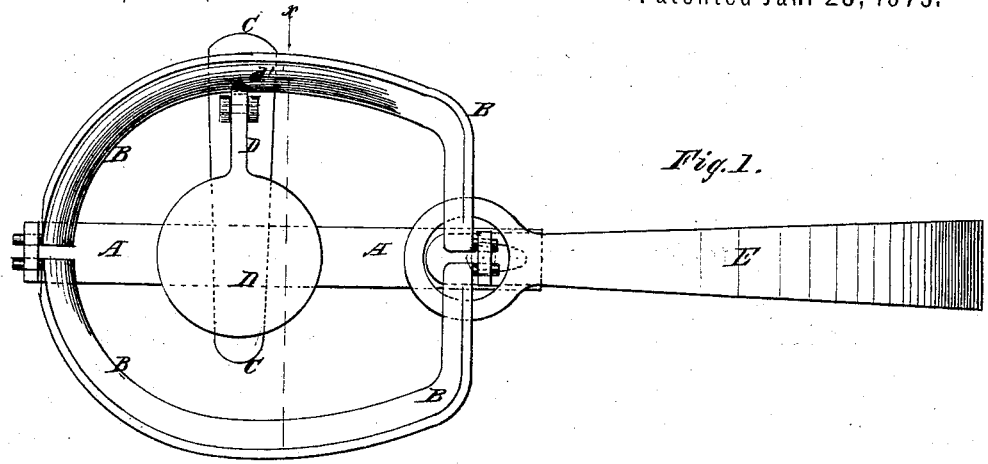
Figure 2:
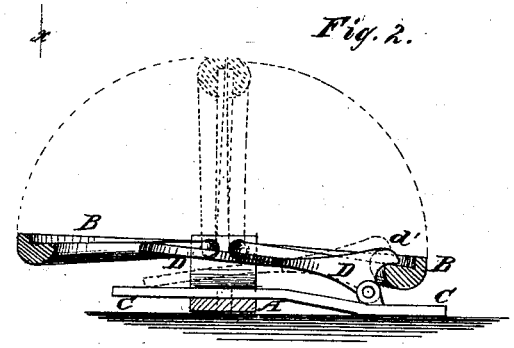
Figure 3:
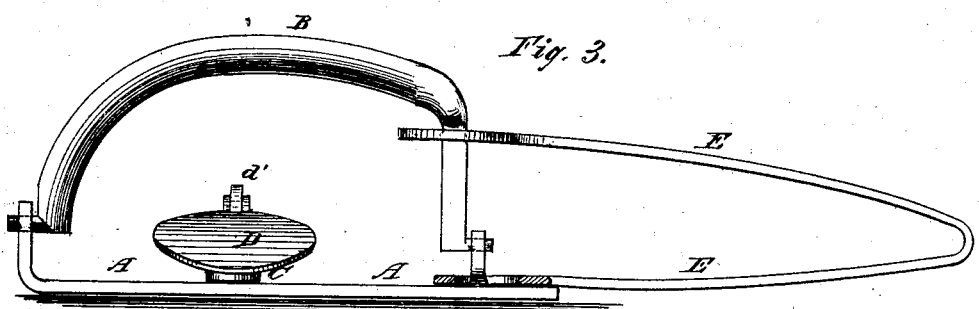

Be it known that I, FRANK FLORA, of Pierce, in the county of Stark and State of Ohio, have invented a new and useful Improvement in Animal-Trap, of which the following is a specification:

Figure 1 is a top view of my improved trap, shown as "set." Fig. 2 is a cross-section of the same taken through the line $x\ x$, Fig. 1, and showing in dotted lines the position of the jaws when sprung. Fig. 3 is a side view of the trap, shown as sprung.

Similar letters of reference indicate corresponding parts.

My invention has for its object to furnish an improved animal-trap, which shall be so constructed that the animal cannot have his foot thrown from the trap in springing it, and so that the animal cannot draw his leg out of the jaws of the trap by eating off his foot, and which shall, at the same time, be simple in construction and convenient in use. The invention consists in the jaws made with a rabbet or flange upon their inner sides, and in the toe formed upon the shank of the bait-pan to catch upon the jaw in setting the trap, as hereinafter fully described.

A represents the base-bar of the trap, to the turned-up ends of which, or to studs attached to said ends, are pivoted the jaws B, which are curved in the ordinary manner. The jaws B are made wide and are rabbeted, as shown in Figs. 1 and 2, so as to leave the edges or jaws proper of the trap narrow to take a firm hold upon the animal caught, and so as to form flanges upon the inner sides of said jaws. By this construction the flanges upon the inner sides of the jaws B will have a space between them when the trap is sprung, and will serve as guards to prevent the animal from eating off his foot so close to the jaws as to enable him to draw out his leg. To the base-bar A is attached a cross-bar, C, to which, at or near its outer end is pivoted the shank of the bait-pan D. The upper part of the shank of the bait-pan D has a toe, $d'$, formed upon it, which projects so much that when the bait-pan D is raised into a horizontal position the said toe may catch upon the inner edge of the rabbeted or flanged jaw B, and thus set the trap, as shown in Figs. 1 and 2. By this construction the necessity of a lever crossing the jaw when the trap is set is obviated, so that the animal cannot set his foot upon said lever when trying to reach the bait, and thus have his foot thrown out of the jaws of the trap by the backward throw of said lever when the trap is sprung. With my construction the animal's foot must always be within the jaws when the trap is sprung. E is the U-spring by which the jaws are forced together and held in the ordinary manner.

Having thus described my invention, I claim as new and desire to secure by Letters Patent—

1. The jaws B, made with a rabbet or flange upon their inner sides, substantially as herein shown and described.

2. The toe $d'$ formed upon the shank of the bait-pan D to catch upon the jaw B in setting the trap, substantially as herein shown and described.

FRANK FLORA.

Witnesses:
 ED. A. LEE,
 J. W. BARNABY.